United States Patent [19]
Wagner

[11] Patent Number: 6,074,000
[45] Date of Patent: Jun. 13, 2000

[54] VEHICLE SEAT AND RECEPTACLE

[75] Inventor: Paul N. Wagner, Warsaw, Ind.

[73] Assignee: Borneman Products, Inc., Bremen, Ind.

[21] Appl. No.: 08/735,228

[22] Filed: Oct. 22, 1996

[51] Int. Cl.[7] .................................................. A47C 7/62
[52] U.S. Cl. ............................. 297/188.11; 297/188.08; 312/235.2; 312/286
[58] Field of Search ....................... 297/188.08, 188.11; 312/235.2, 286, 334.11

[56] References Cited

U.S. PATENT DOCUMENTS

| | | | |
|---|---|---|---|
| 1,736,108 | 11/1929 | Anderson et al. | 312/286 |
| 2,565,784 | 8/1951 | Sheean | 312/286 |
| 2,671,228 | 3/1954 | De Maria | 297/188.11 |
| 3,026,141 | 3/1962 | Welles | 297/188.11 |
| 4,061,395 | 12/1977 | Boole | 297/188.11 |
| 4,183,596 | 1/1980 | Greene et al. | 312/286 |
| 5,096,249 | 3/1992 | Hines | 297/188.11 |
| 5,520,436 | 5/1996 | Rader et al. | 297/188.11 |

Primary Examiner—Anthony D. Barfield
Attorney, Agent, or Firm—Baker & Daniels

[57] ABSTRACT

A storage receptacle is disposed under a vehicle seat and is mounted on the seat supports supporting the seat on the floor of the vehicle by drawer runners. Accordingly, the seat can be moved to a loading position past the forward edge of the seat and then moved to a storage position underneath the seat for transport. Since the receptacle is mounted on the seat supports, the receptacle is removed and installed in the vehicle when the seat is removed and installed in the vehicle. Optionally, the runners may be configured to permit movement of the receptacle from beneath the seat to a storage position past the rear end of the seat, so that access is permitted to the receptacle through, for example, open rear van doors when the seat is installed in a van.

12 Claims, 6 Drawing Sheets

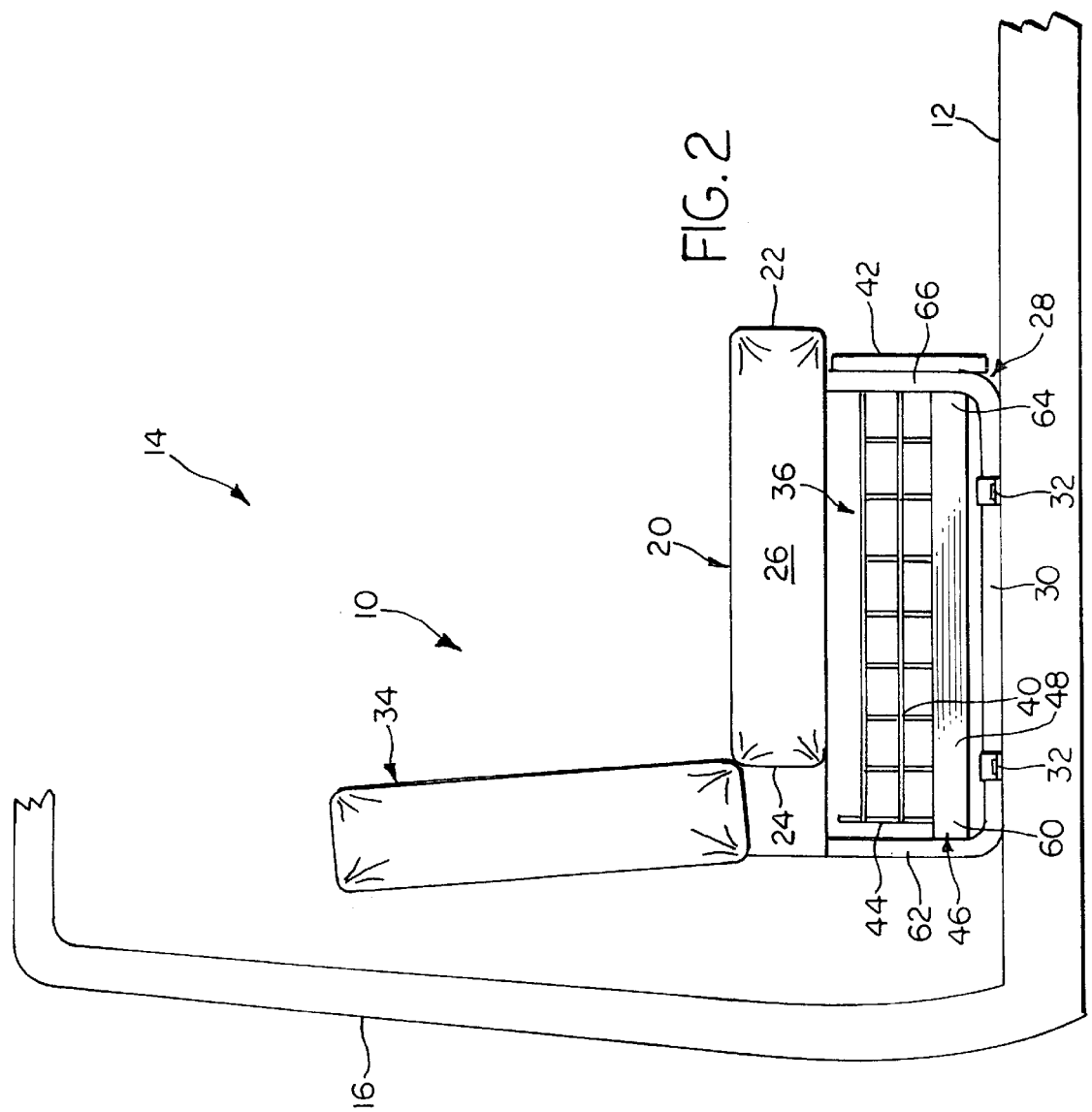

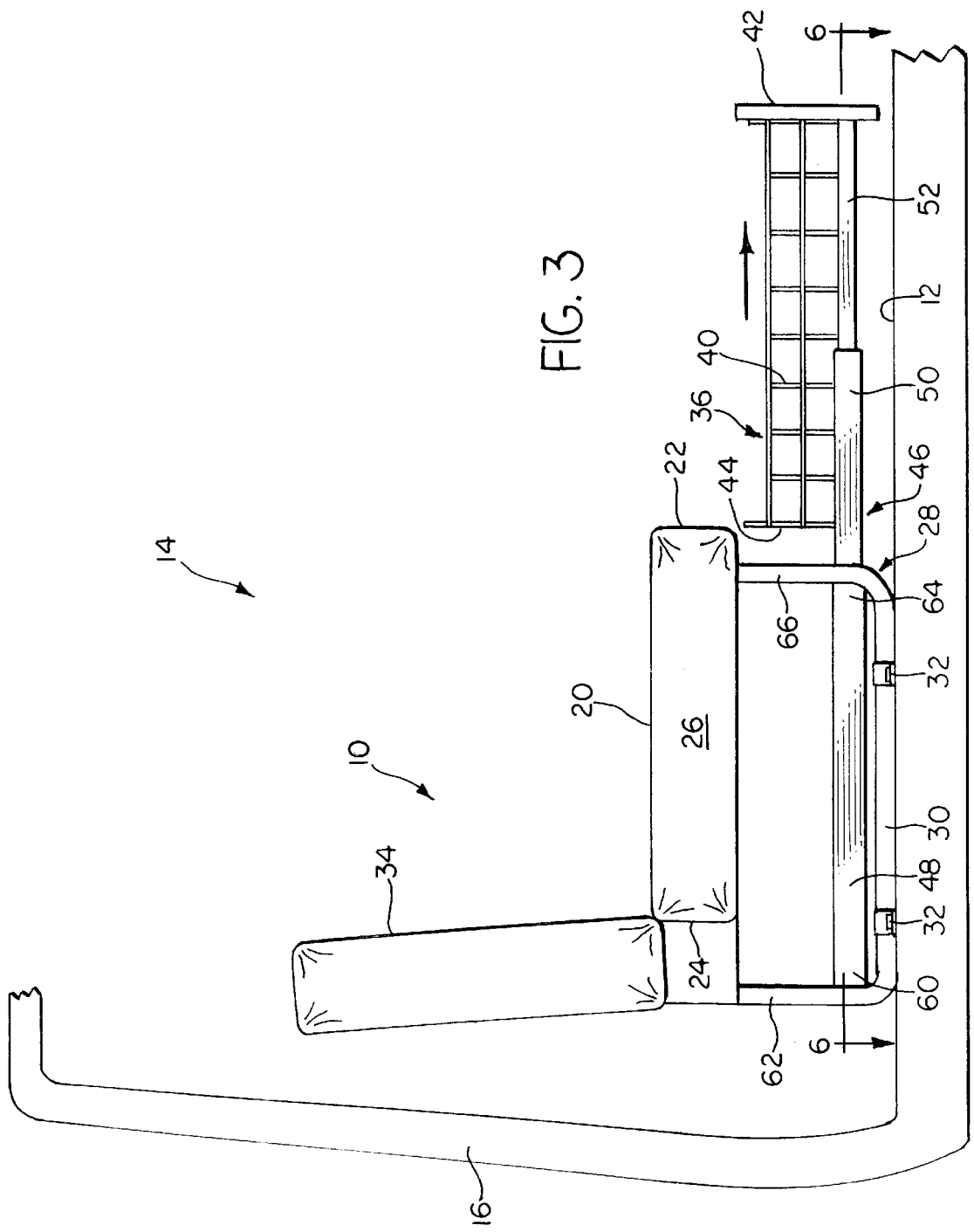

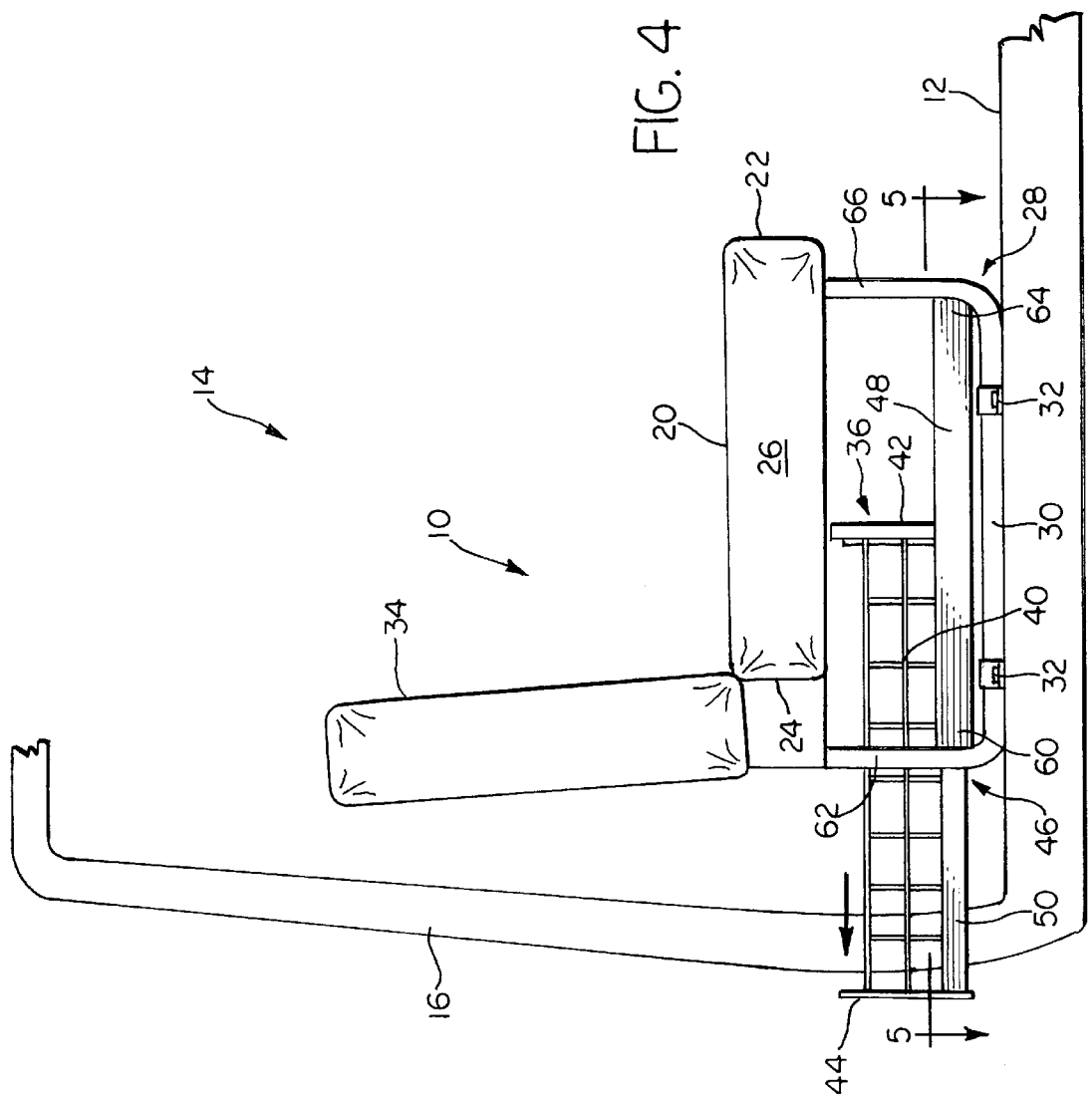

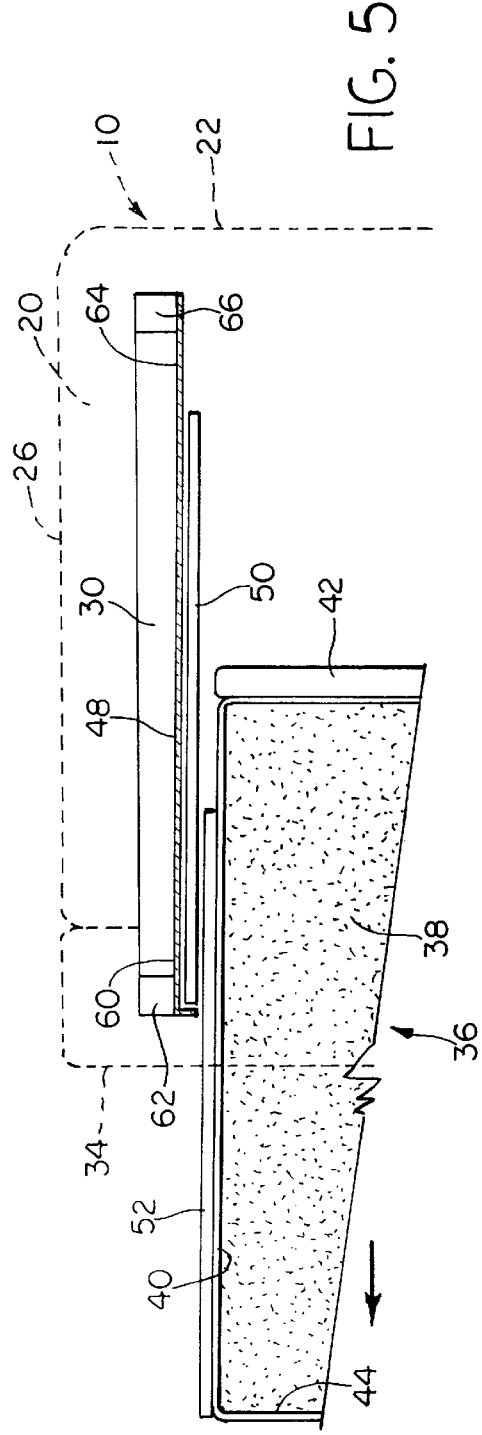
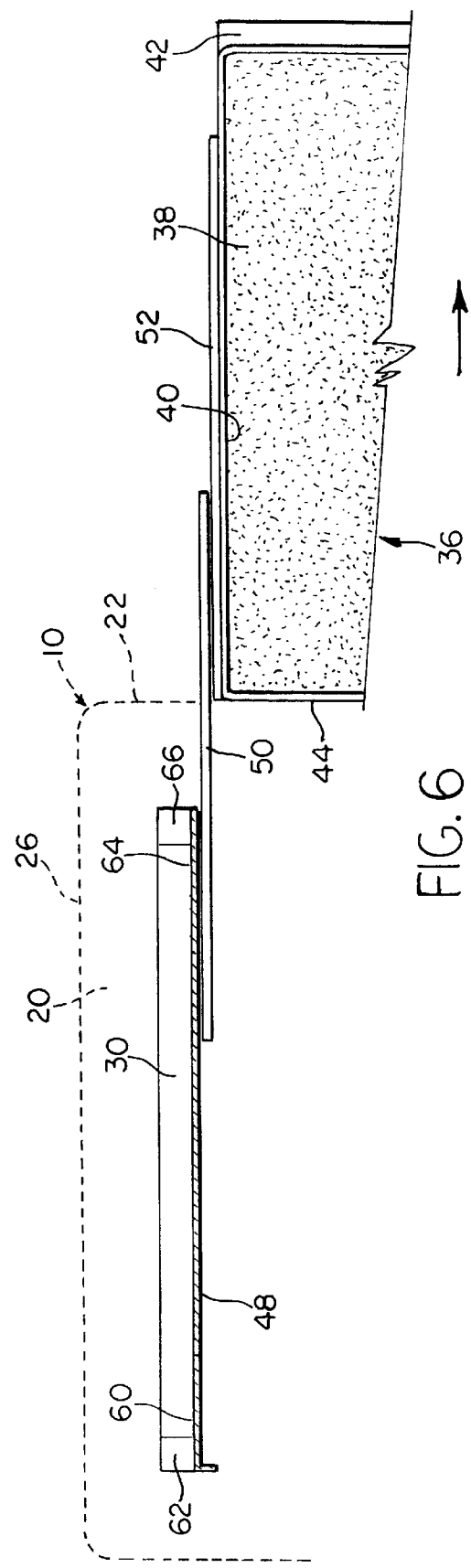

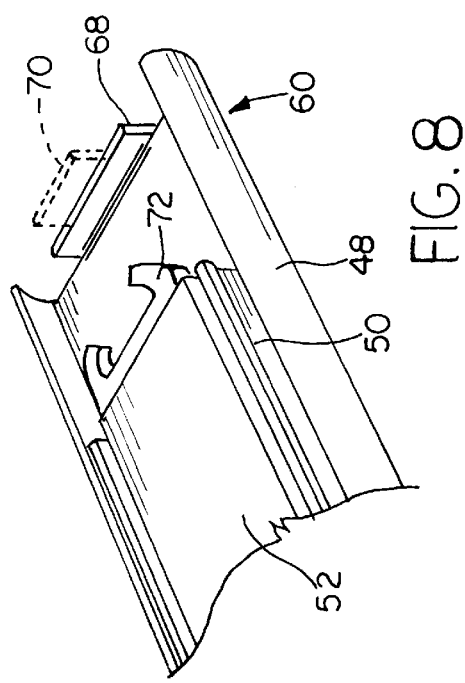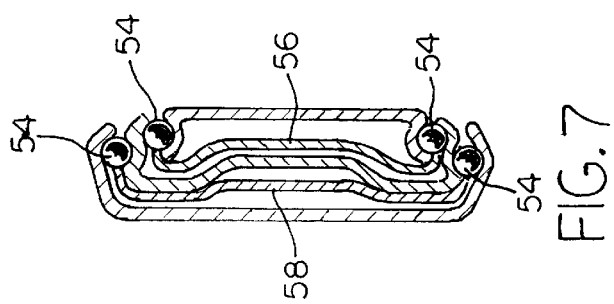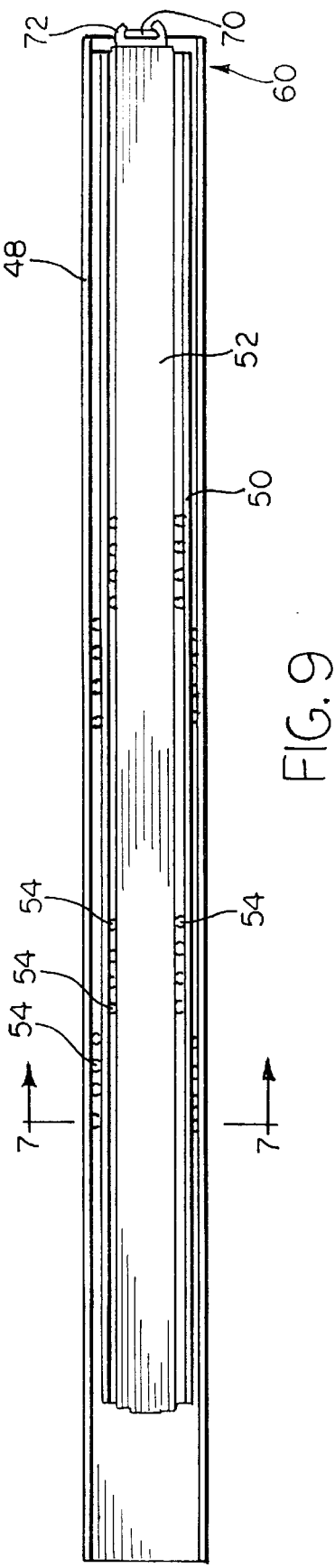

VEHICLE SEAT AND RECEPTACLE

This invention relates to a vehicle seat and a receptacle mounted on the seat but beneath the seating area for storage of objects.

There is a substantial volume beneath the seating area of a vehicle seat that is wasted, particularly in seating used in converted vans and other recreational vehicles. Drawers have been mounted in this volume on the floor of the vehicle and may be moved relative to the floor from beneath the seat to facilitate loading and unloading.

In converted vans and other recreational vehicles, it is desirable to be able to remove seating from the vehicle to convert the vehicle from hauling passengers to hauling cargo. In prior art seating provided with under-seat drawers, either the seating could not be removed and was permanently affixed to the vehicle, or the seating had to be removed separately from the drawer. Clearly, removing the seating and then separately removing the drawer is undesirable. Furthermore, prior art seats equipped with under-seat storage drawers permitted the under-seat storage drawer to be moved only past the forward edge of the seat for loading and unloading. Since converted vans are normally equipped with a large seat in the rear, it is desirable to be able to load and unload an underseat drawer either from the rear of the vehicle through the open vehicle rear doors or from the area just forward of the front edge of the seat.

According to the present invention, an under-seat drawer or receptacle is mounted on drawer runners which mount the receptacle on the seat supports which mount the seat within the vehicle. The seat supports are secured to the floor of the vehicle through releasable latches. Accordingly, the receptacle or drawer of the present invention is removed and installed with the seat. Furthermore, the drawer runners area to mount the drawer or receptacle on the seat may optionally be configured to permit the drawer to slide relative to the seat either past the forward edge of the seating area to permit passengers to deposit and retrieve objects from the drawer while the vehicle is being used, or the drawer can be moved past the back edge of the seat, thereby permitting the drawer to be easily loaded and unloaded through the rear cargo doors of the vehicle when the vehicle is stopped.

These and other advantages of the present invention will become apparent from the following description, with reference to the accompanying drawings, in which:

FIG. 2 is a side elevational view of the vehicle seat and storage receptacle illustrated in FIG. 1, the receptacle being shown in the closed or storage position;

FIG. 3 is a view similar to FIG. 2, but illustrating the receptacle in the open or loading position displaced from under the forward edge of the seat;

FIG. 4 is a view similar to FIGS. 2 and 3 but illustrating the receptacle disposed in a second loading position displaced from under the rear edge of the seat;

FIG. 5 is a cross-sectional view taken substantially along lines 5—5 of FIG. 4;

FIG. 6 is a view taken substantially along lines 6—6 of FIG. 3;

FIG. 7 is an enlarged cross-sectional view taken substantially along lines 7—7 of FIG. 9;

FIG. 8 is a fragmentary perspective view of the rightwardmost portion of FIG. 9; and FIG. 9 is a side elevational view of the drawer runners used to support the underseat receptacle on the seat support of the present invention.

Figure 1:
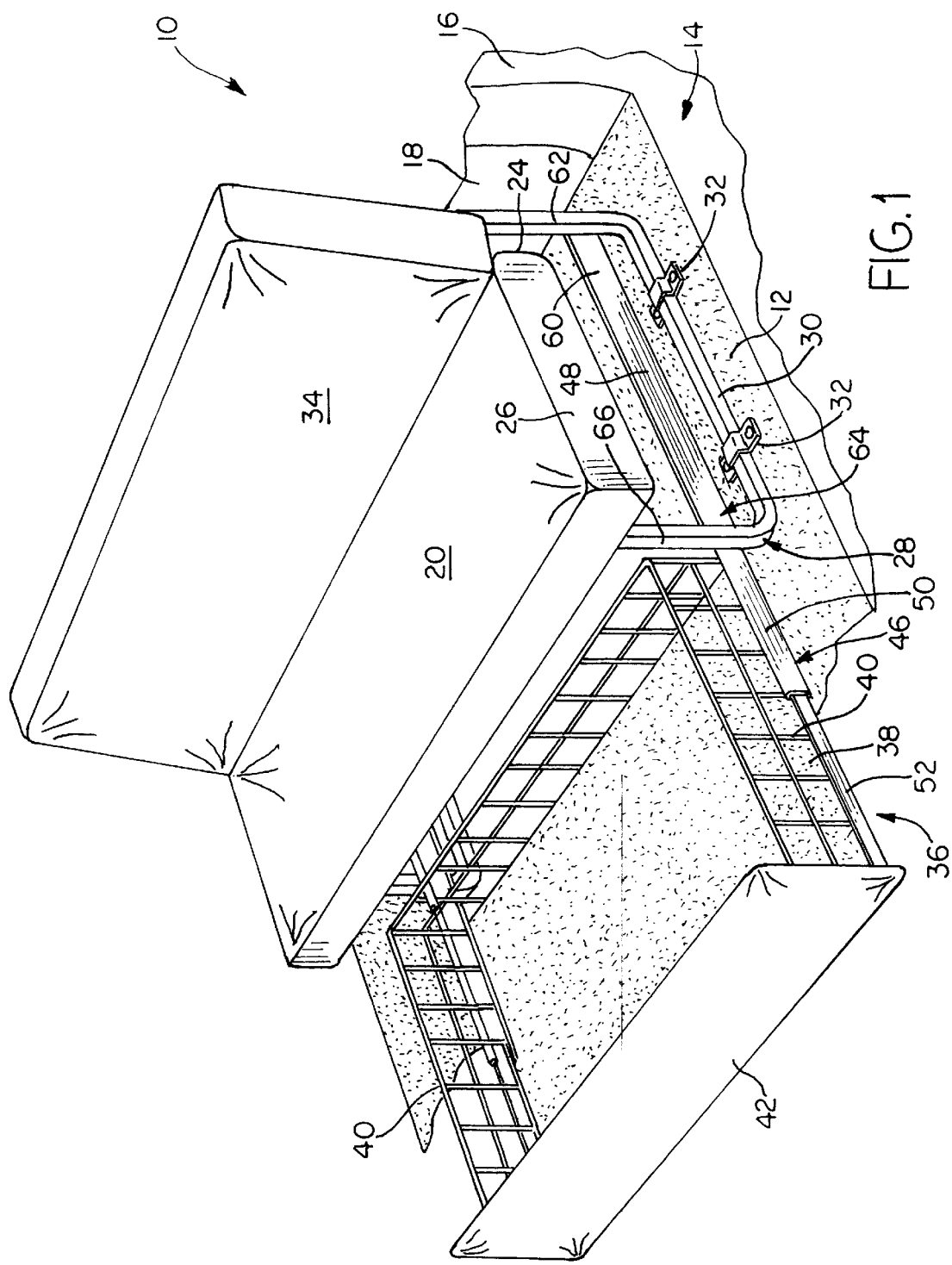
FIG. 1 is a view in perspective of a vehicle seat and storage receptacle made pursuant to the teachings of the present invention, the receptacle being shown disposed in a loading position displaced from the storage position under the seat.

Referring now to the drawings, the vehicle seat 10 is mounted on the floor 12 of a van or similar vehicle generally indicated by the numeral 14. The vehicle 14 includes a rear bulkhead 16 and doors 18 permitting access to the interior of the vehicle from the rear thereof. Seat 10 includes a seating area or cushion 20 having a forward edge 22, a rear edge 24, and side edges 26. The seating area 20 is supported on the floor 12 by seat supports or frames generally indicated by the numeral 28. The seat supports or frames 28 include a portion 30 resting on the floor 12 of the vehicle and secured thereto by removable fasteners 32. Seat 10 further includes a seat back 34 which is mounted adjacent the rear edge 24 of the seating area or cushion 20. Accordingly, the entire seat 10 may be removed from the vehicle when the vehicle is to be converted from hauling people to hauling cargo, by removing fasteners 32 and lifting the seat 10 out of the vehicle through the doors 18.

As can be seen from the drawings, a substantial volume exists below the seating area 20 and between the side supports 28 that is normally wasted. Accordingly, a storage receptacle generally indicated by the numeral 36 is provided for the storage of objects and which is moveable from a loading position illustrated in FIG. 1 in which the receptacle 36 is disposed in a position displaced in front of the edge 22 of the seating area 20, to a storage position illustrated in FIG. 2 in which the receptacle 36 is disposed in a storage position in the volume defined beneath the seating area 20 and between the side supports 28. The receptacle 36 includes a solid bottom 38 (which may be covered with a carpet or similar textured material), side walls 40, and front and rear walls 42, 44 respectively. The receptacle 36 is mounted on each of the seat supports 28 by a pair of drawer runners generally indicated by the numeral 46. The drawer runners 46 consist of relatively slidable members 48, 50, and 52. The member 48 is secured to the corresponding side supports 28, the member 52 is secured to a corresponding side wall 40, and the member 46 supports the member 52 on the member 48 such that the member 52 slides relative to the member 46 and the member 46 is slidably received within the member 48. Accordingly, the receptacle 36 is mounted for sliding movement from an open or loading position illustrated in FIG. 1 in which the receptacle is disposed just beyond the front edge 22 of the seating area 20 such that the receptacle can receive objects to be stored therein during transport, to a closed position illustrated in FIG. 2 in which the receptacle is disposed in the volume defined beneath the seating area 20 and between the side supports 28, where the receptacle is out of the way during operation of the vehicle. It will further be noted that the sides 40 and back 44 of the receptacle 36 are preferably made of open, wire-mesh construction, thereby saving weight. It will also be noted that the receptacle 36 is wholly supported on the side supports 28 through the runners 46. Accordingly, the receptacle 36 is installed and removed with the seat 10 when the seat is installed and removed from the vehicle. The drawer runners 46, as most clearly shown in FIGS. 7 and 9, are constructed such that the sliding members 48, 50 and 52 are slidably supported on one another by ball bearings 54 which are supported in cages 56, 58.

Referring to the drawer runners 46, the end portion generally indicated by the numeral 60 of the member 48, which is attached to an inner edge of upright 62 of seat support 28 which is closest to the door 18 and which faces a corresponding side wall 40, and the opposite end 64 of each of the members 48 is secured to the other upright 66 of fixed support 28. End 60 of member 48 is provided with an inwardly projecting tab 68 from which an extension 70 extends. Movement of the intermediate member 50 is stopped by the tab 68 and movement of the member 52 is stopped by the extension 70 to define the closed or storage position of the receptacle 36. The member 52 is provided by a bumper 72 which engages the extension 70. By removing the extension 70 and the bumper 72, receptacle 36 is permitted to slide past the rear edge 24 of the seating area 20, as indicated in FIG. 4. Accordingly, when the doors 18 are opened, access to the receptacle is provided, by sliding the latter into the FIG. 4 position. Accordingly, loading of the receptacle may be effected from the rear of the vehicle through the doors 18.

I claim:

1. A vehicle seat and a storage receptacle disposed under said vehicle seat, said seat including a pair of side supports supporting a seating area, securing means releasably securing said side supports to a motor vehicle, a pair of drawer runners mounted on each of said supports and on said receptacle to mount said receptacle for sliding movement between a storage position under said seating area to a loading position displaced from said seating area to permit loading of said receptacle, whereby said receptacle is attached by said drawer runners to said vehicle seat and is installed and removed with said seat when the vehicle seat is installed and removed from the motor vehicle, said receptacle including a pair of side members, each of said side members being disposed adjacent an inner edge of a corresponding side support facing the corresponding side member, each of said drawer runners including a pair of relatively slidable members, one of said members bring secured to said inner edge of a corresponding one of said side supports and another of said members being secured to a side member of the receptacle.

2. Vehicle seat and storage receptacle as claimed in claim 1, wherein each drawer runner includes an intermediate slidable member between said one and said other slidable members, said intermediate member being slidable with respect to both said one and said other slidable member and supporting said other slidable member for movement relative to said one slidable member.

3. Vehicle seat and storage receptacle as claimed in claim 2, wherein said intermediate member includes an end portion movable beyond an end of said one member to permit the other member to slide beyond said end of the one member as the receptacle is moved from said storage position to the loading position.

4. Vehicle seat and storage receptacle as claimed in claim 3, wherein anti-friction sliding support mechanisms between said members support said intermediate and other member for movement relative to the one member.

5. Vehicle seat and storage receptacle as claimed in claim 1, wherein said seating area includes a forward edge and a back edge, said seat including a seat back extending generally upwardly from said seating area, said receptacle being supported for movement from said storage position to said loading position across the forward edge of said seating area.

6. Vehicle seat and storage receptacle as claimed in claim 1, wherein said seating area includes a forward edge and a back edge, said seat including a seat back extending generally upwardly from said seating area, said receptacle being supported for movement from said storage position to said loading position across the back edge of said seating area.

7. A vehicle seat and a storage receptacle disposed under said vehicle seat, said seat including a pair of side supports supporting a seating area having a forward edge and a back edge, securing means releasably securing said side supports to a motor vehicle, receptacle mounting means mounted on each of said supports and on said receptacle to mount said receptacle for sliding movement from a storage position under said seating area to a first loading position displaced from said seating area across the forward edge of the seating area to permit loading of said receptacle from adjacent the forward edge of the seating area to a second loading position displaced from said seating area across the back edge of the seating area to permit loading of the receptacle from adjacent the rear edge of the seating area.

8. Vehicle seat and storage receptacle as claimed in claim 7, wherein said receptacle is mounted on said side supports by a pair of drawer runners, each of said drawer runners including a pair of relatively slidable members, one of said members being mounted on a seat support, the other member being mounted on one side of the receptacle.

9. Vehicle seat and storage receptacle as claimed in claim 8, wherein each drawer runner includes an intermediate slidable member between said one and said other slidable members, said intermediate member being slidable with respect to both said one and said other slidable member and supporting said other slidable member for movement relative to said one slidable member.

10. Vehicle seat and storage receptacle as claimed in claim 9, wherein said intermediate member includes an end portion movable beyond one end of said one member to permit the other member to slide beyond said one end of the one member as the receptacle is moved past said forward edge from said storage position to the first loading position.

11. Vehicle seat and storage receptacle as claimed in claim 10, wherein anti-friction sliding support mechanisms between said members support said intermediate and other member for movement relative to the one member.

12. Vehicle seat and storage receptacle as claimed in claim 9, wherein said intermediate member includes a pair of opposite end portions, stop means carried by one of said members prevents movement of one end portion of said intermediate member from moving past a corresponding end of the one member adjacent the back edge of the seating area to permit said other member to move relative to both said one member and the intermediate member as the receptacle is moved past the back edge of the seating area to said second loading position.

* * * * *